United States Patent [19]
Ericksson et al.

[11] Patent Number: 5,765,972
[45] Date of Patent: Jun. 16, 1998

[54] THREAD CUTTING INSERT

[75] Inventors: Håkan Ericksson, Kungsgarden; Olle Lindström, Sandviken, both of Sweden

[73] Assignee: Sandvik AB, Sandviken, Sweden

[21] Appl. No.: 851,559

[22] Filed: May 6, 1997

Related U.S. Application Data

[63] Continuation of Ser. No. 302,318, Sep. 8, 1994, abandoned.

[30] Foreign Application Priority Data

Sep. 10, 1993 [SE] Sweden .................. 9302945

[51] Int. Cl.$^6$ .............................. B23B 27/16
[52] U.S. Cl. .................. 407/114; 407/115; 407/117
[58] Field of Search .................. 407/114, 115, 407/116, 117, 119

[56] References Cited

U.S. PATENT DOCUMENTS

| | | | |
|---|---|---|---|
| 4,214,845 | 7/1980 | Mori | 407/114 |
| 4,575,888 | 3/1986 | Murén | |
| 4,629,371 | 12/1986 | Maeda et al. | 407/114 |
| 4,681,487 | 7/1987 | Pettersson | 407/114 |
| 5,044,839 | 9/1991 | Takahashi | 407/114 |
| 5,141,367 | 8/1992 | Beeghly et al. | 407/119 |

FOREIGN PATENT DOCUMENTS

| | | | |
|---|---|---|---|
| 0260238 | 9/1988 | Germany | 407/114 |
| 2 254 026 | 9/1992 | United Kingdom | |

*Primary Examiner*—A. L. Pitts
*Assistant Examiner*—Henry W. H. Tsai
*Attorney, Agent, or Firm*—Burns, Doane, Swecker & Mathis, L.L.P.

[57] ABSTRACT

A thread cutting insert comprises a center portion and a plurality of cutting corners project outwardly from the center portion. Each cutting corner comprises a pair of outwardly converging cutting edges which are joined together by a curved tip. Each cutting corner includes a chipbreaking protrusion extending upwardly higher than the upper face of the center portion of the insert. The protrusion includes a front portion facing the tip, and a pair of upwardly converging sides. The front portion and sides are spacially confined to the cutting corner.

10 Claims, 3 Drawing Sheets

1

THREAD CUTTING INSERT

This application is a continuation of application Ser. No. 08/302,318, filed Sep. 8, 1994, now abandoned.

BACKGROUND OF THE INVENTION

The present invention relates to a cutting insert for threading, preferably of substantially triangular form.

A thread-cutting insert typically comprises a body having a flat upper surface, a planar bottom surface and a number of edge surfaces therebetween. The edge surfaces meet at cutting corners each having a chamfered portion with a cutting tip. A recess is countersunk in the upper surface of the cutting corner, the recess being a chipbreaker recess which extends inwardly from the tip.

When cutting threads using a radial feed, a mainly V-shaped chip is obtained which is very stiff and is difficult to handle in a controllable manner. A non-triangular threading insert is known, the nose portion of which is provided with a recess. The chip formation obtained with such insert, however, is not controllable because the degree of curvature of the chip becomes too large which results in chip jamming and an undesirable risky situation for the operator, the workpiece and the insert.

The object of the present invention is to provide a thread cutting insert that overcomes the above mentioned problems. The shape of the insert should give a good controlled chip removal during thread cutting in materials from which fairly long chips are obtained. As a result thereof the same threading insert can be used in operations with limited human resources where a continuous surveillance of chip entanglement is not possible.

It is another object of the invention to provide a threading insert that is optimized for internal threading and can be used in standard type toolholders irrespective of the dimension of the cutting tip.

It is another object of the invention to provide a threading insert with such optimized form that a more efficient cooling of the cutting tip is possible.

It is yet another object of the invention to provide an insert with a chip face that is modified so that its form becomes favorable with regard to the cutting forces and the wear of such tool.

In accordance with another aspect of the invention such insert is provided with multiple cutting corners that can be indexed into several positions in the holder.

SUMMARY OF THE INVENTION

In accordance with the present invention a thread cutting insert is provided which comprises upper and lower faces interconnected by at least three side walls and forming a center portion from which at least one cutting corner projects outwardly. The cutting corner includes a pair of outwardly converging cutting edges which are interconnected by a curved cutting tip. A top surface of the cutting corner includes a chipbreaking protrusion extending higher than the upper face of the center portion. The protrusion has opposite sides extending adjacent respective ones of the cutting edges and converging toward one another in an upward direction. The protrusion further includes a front portion inclined downwardly generally toward the tip, and a rear portion inclined downwardly generally away from the tip. The front portion and the sides are spacially confined substantially to the cutting corner.

Preferably, each of the opposite sides of the protrusion has a recess formed therein, and the sides are spaced from the cutting edges by respective lands.

BRIEF DESCRIPTION OF THE DRAWINGS

These and other objects of the invention will become apparent with reference to the following detailed description of preferred embodiments thereof made in conjunction with the drawings in which.

DETAILED DESCRIPTION OF PREFERRED EMBODIMENTS OF THE INVENTION

Figure 1:
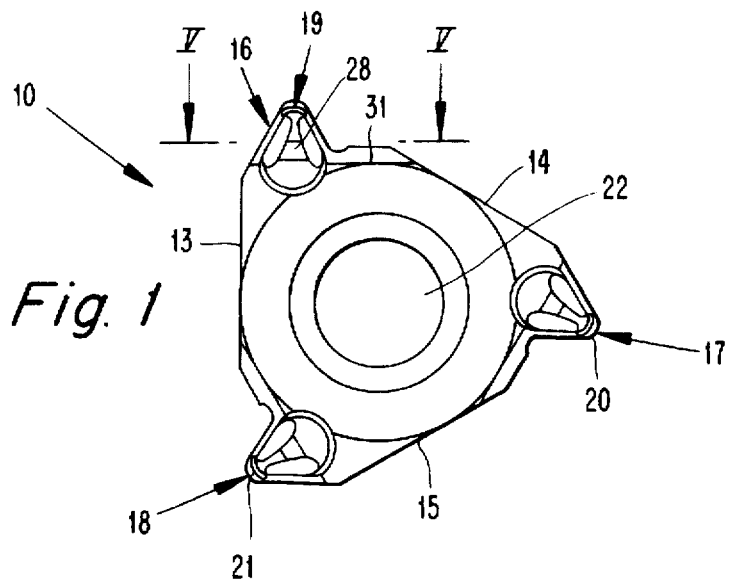
FIG. 1 is a top view of a threading insert for external threading according to the invention
Figure 2:
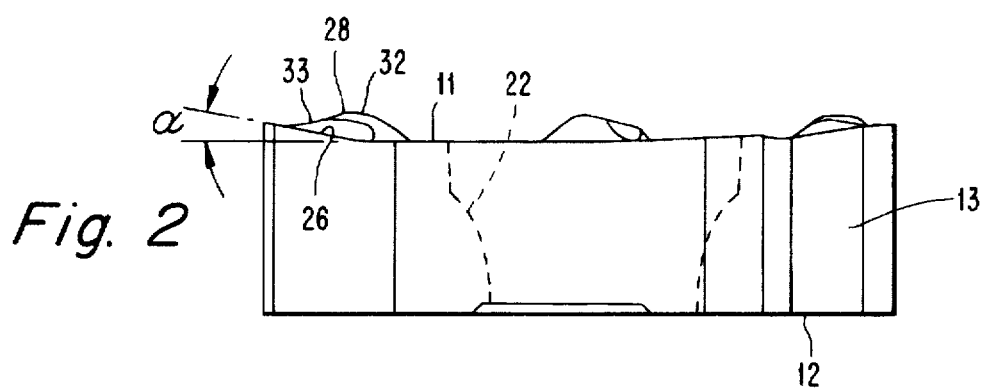
FIG. 2 is a side elevational view of the insert shown in FIG. 1.
Figure 3:
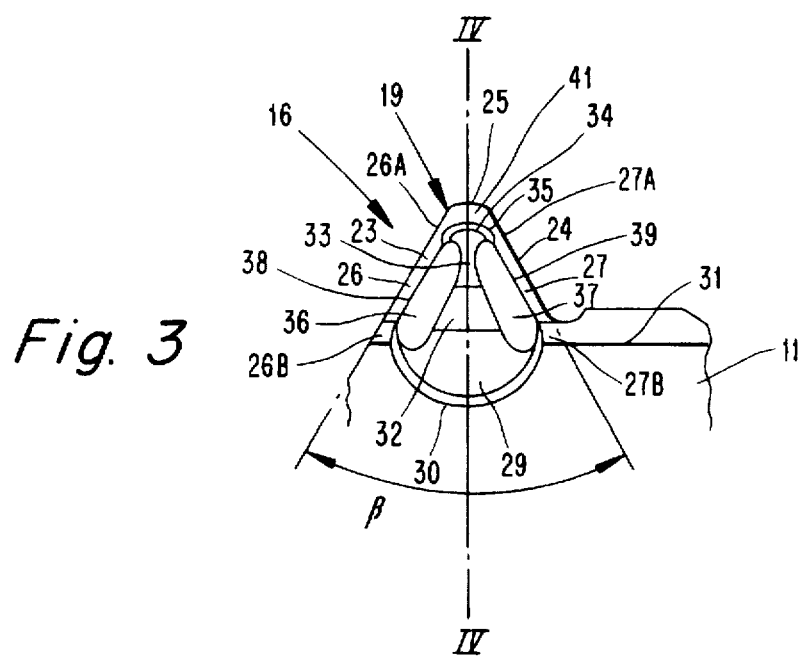
FIG. 3 is a top fragmentary view of an enlarged cutting corner of the insert shown in FIG. 1.

Referring to FIGS. 1–3 the thread cutting insert 10 is in the form of a wafer body of triangular form preferably made of cemented carbide. Other cutting materials can also be used such as oxide based ceramic material or cement. The insert 10 comprises an upper face 11 and a lower face 12 situated opposite and generally parallel to the upper face 11, and a plurality of side walls 13, 14, 15 extending substantially perpendicularly therebetween. The insert 10 is provided with three identical cutting corner portions 16, 17, 18, each of which carries a cutting tip 19, 20, 21 which shall engage with and cut threads of a metallic workpiece (not shown). The insert 10 has a central aperture 22 for the receipt of a fastening screw for its mounting into an insert receiving pocket of a toolholder. The lower surface 12 of the insert has no cutting edges and is only intended for abutment against a supporting surface of the insert pocket.

In FIG. 3 is shown a cutting corner 16 having at its forward end a cutting tip 19 arranged symmetrically to a corner bisector line IV—IV. Alternatively, the cutting tip 19 could be unsymmetrical. The cutting tip has two main cutting edges 23, 24 extending in V-fashion and a corner cutting edge 25 located therebetween. The acute angle β between the main cutting edges 23, 24 amounts to 25°–80°, preferably 50°–70°. The insert has primary phases or lands 26, 27 situated to the inside of the main cutting edges, which lands come to a juncture at the cutting tip 19. The primary lands 26, 27 are located in a common plane which slopes downwards towards the center of the insert at an angle α that preferably amounts to 5°–15° (see FIG. 2). The primary lands 26, 27 serve as edge reinforcement surfaces.

The cutting corner further includes a raised portion 28 in the form of a protrusion which extends higher than the central region defined by the surface 11 (see FIG. 4) and that is intended to serve as a chipbreaker. The raised portion 28 has a forwardly extending wedge shaped portion whereas its rear portion 29 is generally semi-spherically shaped and forms a circular rear edge 30. The wedge shape of the forward portion is formed by two upwardly converging side edges 36, 37, the configuration of which will be described hereinafter. That forward portion of the raised portion 28 is confined to a region situated between the downwardly sloping plane that contains the primary lands 26, 27, whereas the rear portion 29 of raised portion 28 is convexly curved and terminated by a curved rear edge 30 that lies in the plane of the upper surface 11. More specifically, the wedge-shaped portion of the raised portion 28 extends to the curved rear portion 29 along a section line 31 which defines the transition between the plane of the primary lands 26, 27 and the upper chip face 11.

Figure 4:
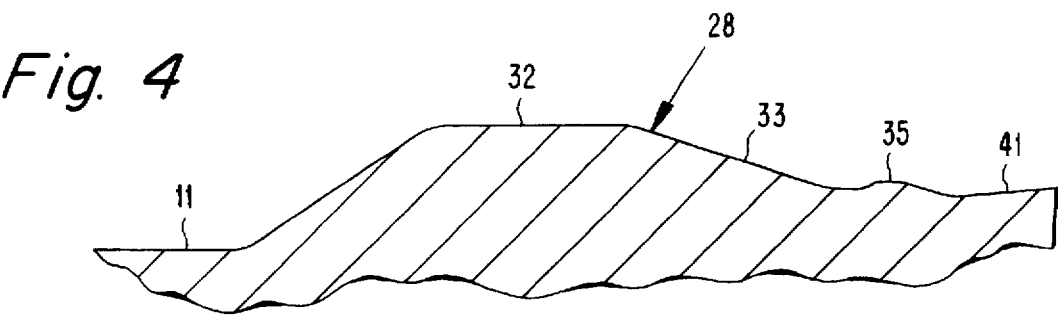
FIG. 4 is a sectional view, taken along the line IV—IV in FIG. 3.
Figure 5:
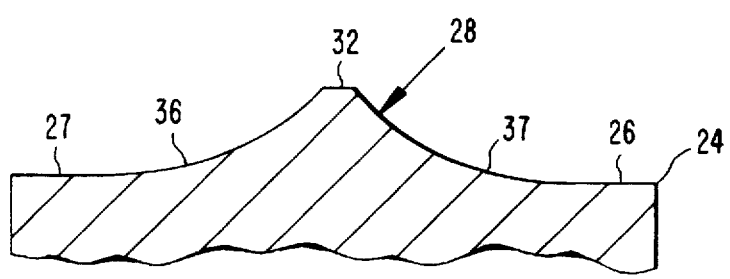
FIG. 5 is a sectional view taken along the line V—V in FIG. 1.

The uppermost surface 32 of the raised portion 28 is planar and is contiguous with a front surface 33 which extends downwardly to an edge 34 that is curved (as viewed in FIG. 3) and which constitutes an inner edge of an essentially C-shaped upper surface portion 35, with the open side of the "C" facing rearwardly as can be seen in FIG. 3. The surface 34 is convexly raised as can be seen in FIG. 4. It is also a distinguishing feature that the side surfaces of the wedge formed portion 28 are provided with concave recesses 36 and 37.

Figure 6:
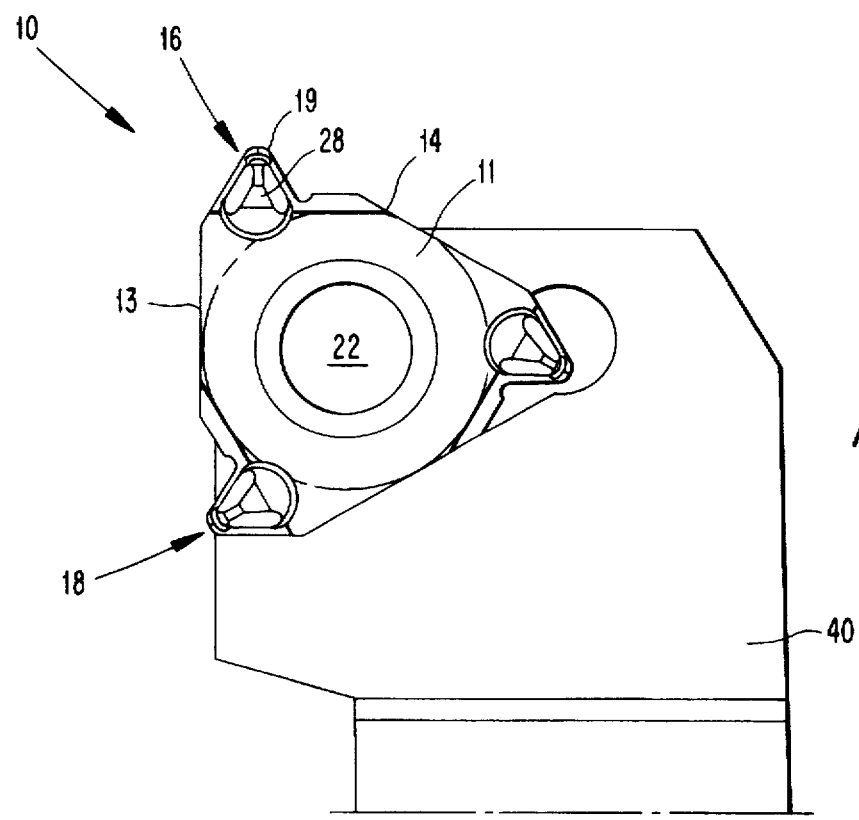
FIG. 6 is a top view of the insert in FIG. 1 located in an insert receiving pocket of a toolholder.
Figure 7:
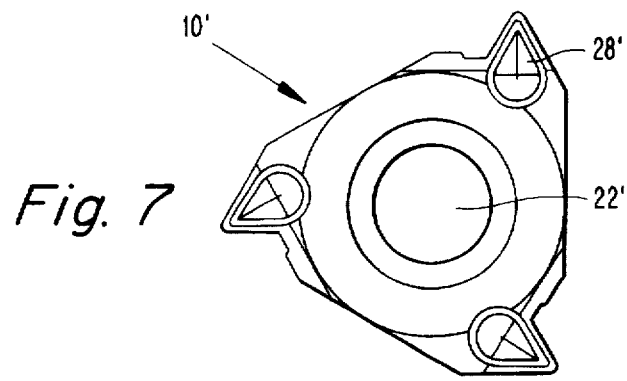
FIG. 7 is a top view of a threading insert for internal threading according to the invention.
Figure 8:
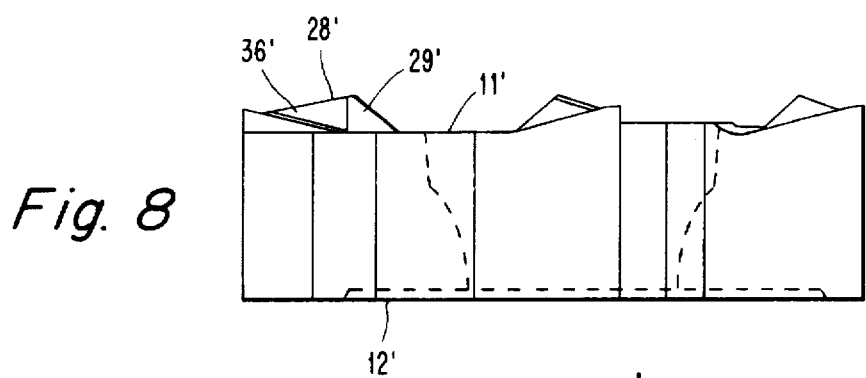
FIG. 8 is a side view of the insert in FIG. 7.
Figure 9:
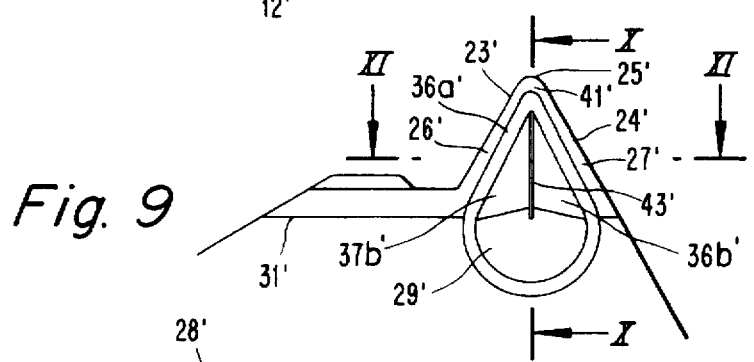
FIG. 9 is a top view of an enlarged cutting corner of the insert in FIG. 7.
Figure 10:
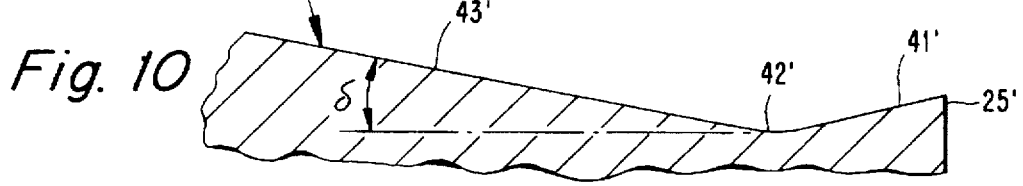
FIG. 10 is a sectional view taken along the line X—X in FIG. 9.
Figure 11:
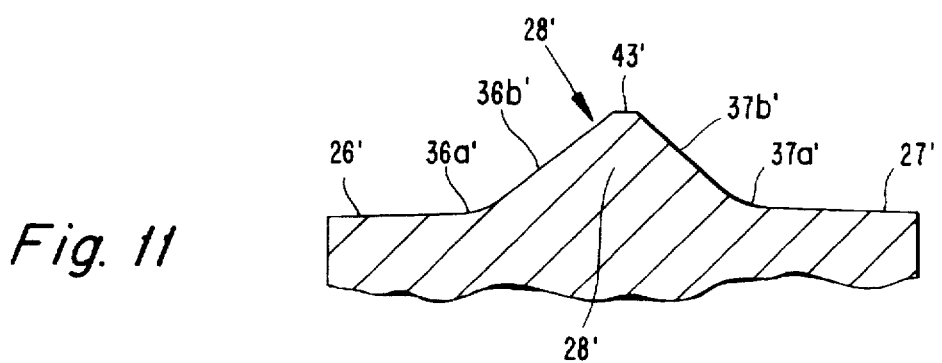
FIG. 11 is a sectional view taken along the line XI—XI in FIG. 9.

FIG. 6 illustrates the insert after being secured into a pocket of a toolholder 40, the bottom surface 12 of the insert being in abutment with a corresponding bottom support surface of the pocket. One cutting tip 19 of the insert is exposed from the pocket in order to be engageable with a workpiece for cutting of threads.

The width of each of the primary lands 26, 27 is essentially smaller at a location 26A, 27A adjacent to the C-formed portion 35 as compared with the width thereof at locations 26B, 27B disposed closer to the central portions of the insert. These primary lands 26, 27 extend forwardly to form a corner phase 41 the width of which is somewhat larger than the width of either of the primary lands.

During use of the cutting insert for the cutting of threads with radial feeding, the chip will be cut by either of the cutting edges 23, 24 or along parts thereof and therefore the chip will be preformed while it follows an upward path towards the C-shaped portion 35 after which it is additionally formed by the recess 36 or 37 of the raised portion 28. The chip is then finally shaped and controlled by the inclined surface 33 so that it obtains a small radius of curvature like a spiral at the same time as the chip is guided away from the workpiece and the tool. Thanks to this form of the chip face at the V-shaped cutting corner 16 a satisfactory working result is achieved when using the same insert for machining different materials and at varying machining data. By limiting the chipbreaker protrusion 28 only to the corner region while providing the center region 11 of the insert as a recessed portion in relation to the chipbreaker (see FIG. 4), it is possible to provide a more efficient supply of a cooling medium towards the active cutting tip.

In FIGS. 7-11 there is shown an alternative embodiment intended for the internal thread cutting of a workpiece. In similarity with FIGS. 1-3, each cutting corner has two main cutting edges 23', 24' and a curved cutting edge 25' therebetween. Each corner is provided with a raised chipbreaker portion 28' the forward portion of which is confined to the corner area. The forward portion of the raised portion 28' located next to the corner edge 25' is essentially wedge-shaped (see FIG. 11) whereas the rear portion 29' is convex.

Each of the side surfaces of the portion 28' (which are located adjacent the primary lands 26', 27') is composed of a circular concave portion 36a', 37a' and a straight portion 36b', 37b' which intersects a planar top portion 43'. The top portion 43' is essentially flat and intersects the plane of the top surface 11 of the insert at an angle δ of 5°–20°. There is a difference in design with this insert in comparison with FIGS. 1-3 to the extent that the insert of FIGS. 7-11 lacks the provision of a convexly raised portion of the type shown at 35 in FIG. 4. The insert has a bevelled phase 41' next to the corner edge 25' which, via concave recess 42', merges with the upwardly inclined planar surface 43'. Thanks to this embodiment a more efficient chipbreaking and chip removal can be achieved during internal thread cutting thereby avoiding problematic chip entanglement that would otherwise occur.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A thread cutting insert comprising upper and lower faces interconnected by at least three side walls and forming a center portion from which at least one cutting corner projects outwardly, said cutting corner including a pair of outwardly and upwardly converging cutting edges, the outer ends of which are interconnected by a curved cutting tip situated higher than said upper face of said center portion, a top surface of said cutting corner being inclined upwardly and outwardly at an angle with respect to said upper face of said center portion, said top surface including a chipbreaking protrusion extending upwardly higher than said upper face of said center portion, said protrusion having opposite side extending adjacent respective ones of said cutting edges and converging toward one another in an upward direction and in an outward direction toward said cutting tip, said sides being spaced from respective ones of said cutting edges such that said top surface forms a land situated between each of said sides and its respective cutting edge, said protrusion further including front and rear portions, said front portion being disposed on said upwardly and outwardly inclined top surface and inclined downwardly generally toward said tip, said rear portion being disposed on said upper face of said center portion.

2. The thread cutting insert according to claim 1, wherein said rear portion of said protrusion is of convex configuration.

3. The thread cutting insert according to claim 2, wherein said rear portion intersects said upper face to form therewith an edge shaped as a segment of a circle.

4. The thread cutting insert according to claim 1, there being a raised surface disposed at a lower end of said front portion; said raised surface being convexly C-shaped as said insert is viewed in plan, said rear portion of said protrusion extending downwardly to a lower level than said C-shaped surface.

5. The thread cutting insert according to claim 4, wherein said protrusion includes a flat top surface extending from said front portion to said rear portion.

6. The thread cutting insert according to claim 1, wherein each of said sides of said protrusion is defined by a concave recess extending from an upper end to a lower end of said side.

7. The thread cutting insert according to claim 1, wherein each of said sides is substantially flat and merges with a generally concave surface defining a lower end of said side.

8. The thread cutting insert according to claim 2, wherein said convex rear portion joins the rest of said protrusion substantially at an intersection of said top surface and said upper face.

9. The thread cutting insert according to claim 1, wherein said angle is no less than 5 degrees and no greater than 15 degrees.

10. The thread cutting insert according to claim 1, wherein said protrusion includes a top portion extending at an angle of 5 to 20 degrees with respect to said upper face of said center portion.

* * * * *